United States Patent
Saito

(10) Patent No.: US 8,761,693 B2
(45) Date of Patent: Jun. 24, 2014

(54) WIRELESS TRANSMISSION APPARATUS, WIRELESS TRANSMISSION METHOD AND COMPUTER PROGRAM

(75) Inventor: Kaichiro Saito, Tokyo (JP)

(73) Assignee: NEC Corporation

( * ) Notice: Subject to any disclaimer, the term of this patent is extended or adjusted under 35 U.S.C. 154(b) by 156 days.

(21) Appl. No.: 13/498,451

(22) PCT Filed: Sep. 27, 2010

(86) PCT No.: PCT/JP2010/066662
§ 371 (c)(1),
(2), (4) Date: Mar. 27, 2012

(87) PCT Pub. No.: WO2011/037218
PCT Pub. Date: Mar. 31, 2011

(65) Prior Publication Data
US 2012/0184227 A1    Jul. 19, 2012

(30) Foreign Application Priority Data

Sep. 28, 2009   (JP) .................................. 2009-222271

(51) Int. Cl.
*H04B 1/66*      (2006.01)
*H04W 4/00*     (2009.01)

(52) U.S. Cl.
USPC .................... 455/102; 370/395.21; 455/435.3

(58) Field of Classification Search
USPC ............... 370/395.21, 204, 205; 455/61, 106, 455/107, 102, 435.3
See application file for complete search history.

(56) References Cited

U.S. PATENT DOCUMENTS

| | | | |
|---|---|---|---|
| 6,754,189 B1 | 6/2004 | Cloutier et al. | |
| 7,304,939 B2 * | 12/2007 | Steer et al. | 370/208 |
| 7,616,658 B2 * | 11/2009 | Harada et al. | 370/465 |
| 7,821,938 B2 * | 10/2010 | Friedman et al. | 370/232 |
| 8,249,036 B2 * | 8/2012 | Kim | 370/338 |
| 8,315,574 B2 * | 11/2012 | Ashkenazi et al. | 455/69 |
| 2006/0023628 A1 | 2/2006 | Uehara et al. | |
| 2011/0128903 A1 * | 6/2011 | Futaki et al. | 370/312 |
| 2012/0320858 A1 * | 12/2012 | Maru | 370/329 |

FOREIGN PATENT DOCUMENTS

| | | |
|---|---|---|
| JP | 2000-316035 | 11/2000 |
| JP | 2005-072900 | 3/2005 |
| JP | 2006-165939 | 6/2006 |
| JP | 2007-221568 | 8/2007 |
| RU | 2007136021 | 5/2009 |

OTHER PUBLICATIONS

International Search Report, PCT/JP2010/066662, Oct. 26, 2010.
RU Office Action dated Sep. 5, 2013, with English Translation; Application No. 2012111821.

* cited by examiner

*Primary Examiner* — Sonny Trinh
(74) *Attorney, Agent, or Firm* — Young & Thompson

(57) ABSTRACT

A traffic amount calculation portion calculates a traffic amount caused by transmission signals received by a transmission signal reception portion. An average traffic amount calculation portion calculates an average traffic amount that is an average of the traffic amount in a nearest predetermined interval. Further, a modulation method setting portion changes a modulation method used by a modulation portion based on the calculated average traffic amount. In addition, a transmission portion transmits transmission signals by using a transmission power amount corresponding to the modulation method used by the modulation portion.

12 Claims, 7 Drawing Sheets

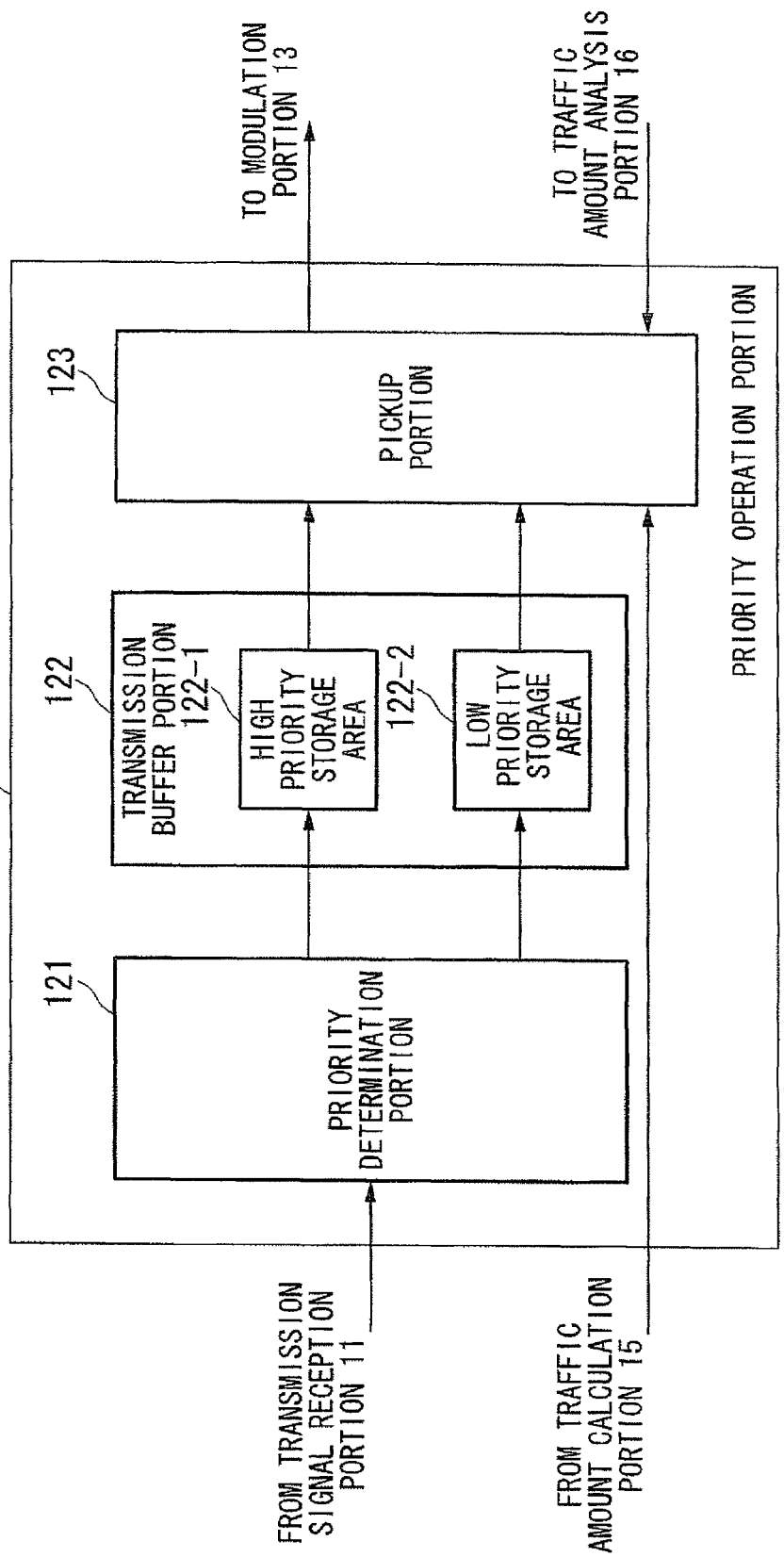

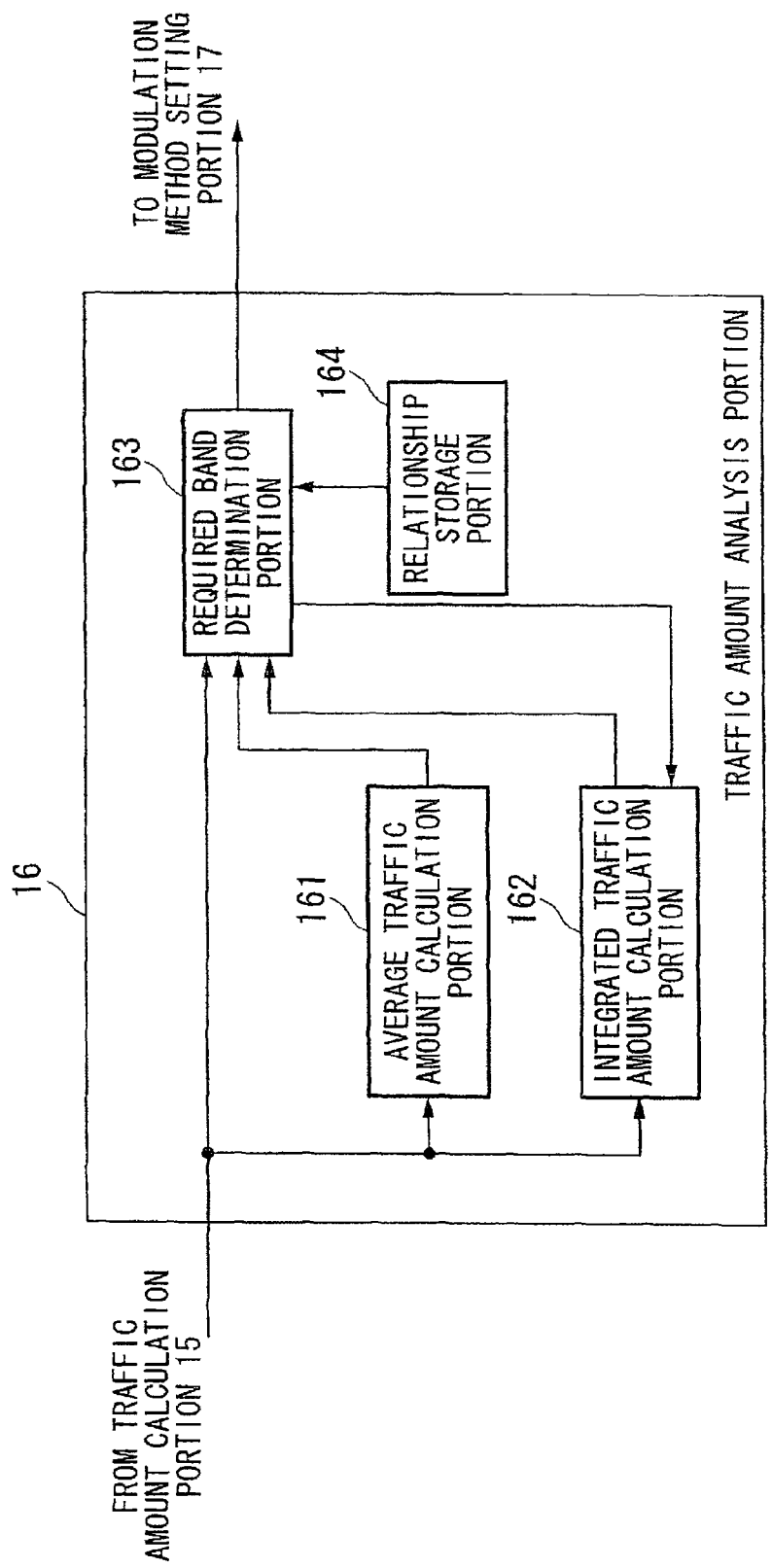

FIG. 4

| WIRELESS TRANSMISSION CAPACITY | ACCEPTABLE TRAFFIC AMOUNT | | MODULATION METHOD | TRANSMISSION POWER AMOUNT |
| --- | --- | --- | --- | --- |
| | UPPER LIMIT VALUE | LOWER LIMIT VALUE | | |
| c1 | th1 | -   | m1 | p1 |
| c2 | th2 | th1 | m2 | p2 |
| c3 | th3 | th2 | m3 | p3 |

FIG. 5

| CONDITION FOR CHANGING WIRELESS TRANSMISSION CAPACITY TO BE LARGER BY ONE STEP | CONDITION FOR CHANGING WIRELESS TRANSMISSION CAPACITY TO BE SMALLER BY ONE STEP |
| --- | --- |
| WHEN BOTH TRAFFIC AMOUNT AND AVERAGE TRAFFIC AMOUNT EXCEED UPPER LIMIT VALUE OF ACCEPTABLE TRAFFIC AMOUNT | WHEN ONE OF TRAFFIC AMOUNT AND AVERAGE TRAFFIC AMOUNT IS LOWER THAN LOWER LIMIT VALUE OF ACCEPTABLE TRAFFIC AMOUNT |
| WHEN INTEGRATED TRAFFIC AMOUNT EXCEEDS CAPACITY THAT CAN BE STORED IN TRANSMISSION BUFFER | |

FIG. 8
(a) 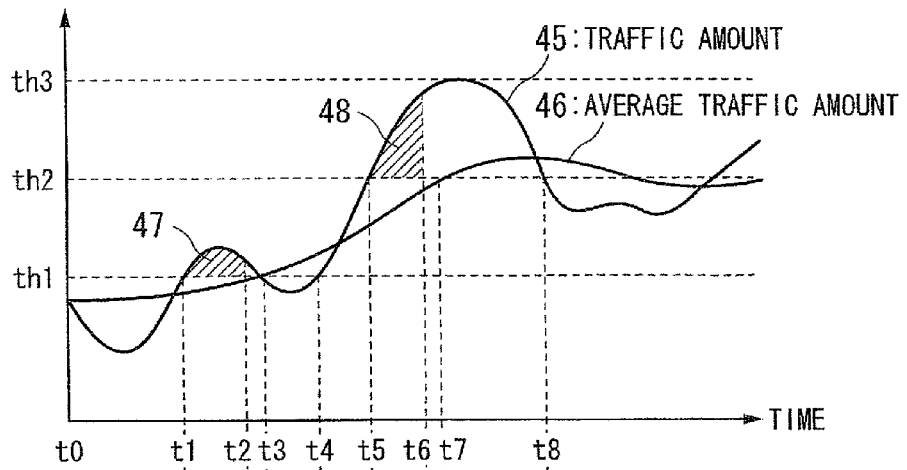
(b) 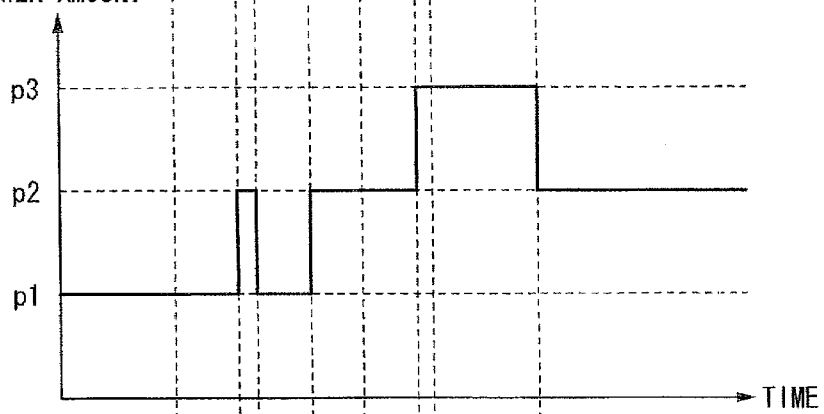
(c) 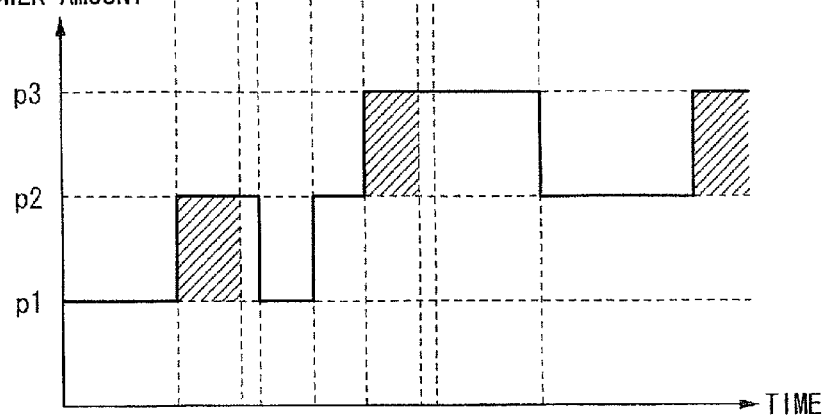

WIRELESS TRANSMISSION APPARATUS, WIRELESS TRANSMISSION METHOD AND COMPUTER PROGRAM

BACKGROUND OF THE INVENTION

1. Technical Field

The present invention relates to a wireless transmission apparatus, a wireless transmission method and a computer program.

Priority is claimed on Japanese Patent Application No. 2009-222271, filed Sep. 28, 2009, the content of which is incorporated herein by reference.

2. Background Art

In conventional cases, a wireless transmission apparatus which handles continuous signal sequences such as PDH (Plesiochronous Digital Hierarchy) signal and SDH (Synchronous Digital Hierarchy) signal successively conducts wireless transmission/reception operations to transmit continuous signals without interruption and suspension. However, recent years, transformation from the networks which handle continuous signal sequences to the networks which handle discrete signal sequences, for example, Ethernet (registered trademark) signals have been increased, and in accordance with such a transformation, applications of conventional wireless transmission apparatuses which handle continuous signal sequences to transmission of discrete signal sequences are increasing.

When applying the wireless transmission apparatuses which handle continuous signal sequences to transmission of discrete signal sequences, such wireless transmission apparatuses continuously conducts wireless transmission/reception operations, that is, always conducts wireless transmission/reception operations regardless of whether or not there are transmission signals. Therefore, a certain amount of electric power is consumed regardless of an increase/decrease in the amount of traffic.

A method for resolving such a problem is proposed in which the electric power consumed by the wireless transmission apparatus is reduced by controlling the electric power for a wireless transmission based on the traffic amount.

For example, Patent Document 1 discloses a technique in which a wireless transmission apparatus selects a modulation method with the lowest transmission speed between modulation methods with a wireless transmission capacity which conforms to a traffic amount. Here, in the modulation method with a low transmission speed, a multi-level number of a modulation is small, and when the multi-level number is comparatively small, the bit-error ratio of a wireless transmission path is comparatively small. In other words, it is possible to conduct a transmission with a low bit error ratio when using a small electric power for transmission because the modulation method with a low transmission speed is used.

However, in the adaptive modulation control method in response to the above-described traffic amount, an adaptive modulation controlling operation follows instant changes of transmission signals. Therefore, if it is instantly determined that a large amount of wireless transmission capacity is necessary even when a large bandwidth is not necessary based on an average of the traffic amount, results of saving the electric power consumption can be insufficient because the transmission power is increased by conducting an extending operation on a wireless transmission capacity.

Patent Document 1: Japanese Patent Application, First Publication No. 2006-165939

SUMMARY OF THE INVENTION

For example, the present invention may include following aspects.

A first aspect is a wireless transmission apparatus for transmitting transmission signals via wireless transmission paths, which includes: a transmission signal reception portion receiving transmission signals; a transmission signal registration portion registering the transmission signals received by the transmission signal reception portion to a transmission buffer portion; a modulation portion which picks up a transmission signal registered at a first position between the transmission signals stored in the transmission buffer portion and which modulates the picked up transmission signal; a transmission portion which transmits the transmission signal modulated by the modulation portion by using a transmission power amount which corresponds to a modulation method used by the modulation portion; a traffic amount calculation portion which calculates a traffic amount caused by the traffic signals received by the transmission signal reception portion at each predetermined unit time interval; an average traffic amount calculation portion which calculates an average traffic amount that is an average of the traffic amount calculated by the traffic amount calculation portion in a nearest predetermined interval every time the traffic amount calculation portion calculates the traffic amount; and a modulation method setting portion which changes the modulation method based on the average traffic amount calculated by the average traffic amount calculation portion.

A second aspect is a wireless transmission method using a wireless transmission apparatus for transmitting transmission signals via wireless transmission paths, which includes steps of: by a transmission signal reception portion, receiving transmission signals; by a transmission signal registration portion, registering the transmission signals received by the transmission signal reception portion to a transmission buffer portion; by a modulation portion, picking up a transmission signal registered at a first position between the transmission signals stored in the transmission buffer portion and modulating the picked up transmission signal; by a transmission portion, transmitting the transmission signal modulated by the modulation portion by using a transmission power amount which corresponds to a modulation method used by the modulation portion; by a traffic amount calculation portion, calculating a traffic amount caused by the traffic signals received by the transmission signal reception portion at each predetermined unit time interval; by an average traffic amount calculation portion, calculating an average traffic amount that is an average of the traffic amount calculated by the traffic amount calculation portion in a nearest predetermined interval every time the traffic amount calculation portion calculates the traffic amount; and by a modulation method setting portion, changing the modulation method based on the average traffic amount calculated by the average traffic amount calculation portion.

A third aspect is a computer program which configures a wireless transmission apparatus for transmitting transmission signals via wireless transmission paths to include functions of: a transmission signal reception portion receiving transmission signals; a transmission signal registration portion registering the transmission signals received by the transmission signal reception portion to a transmission buffer portion; a modulation portion which picks up a transmission signal registered at a first position between the transmission signals stored in the transmission buffer portion and which modulates the picked up transmission signal; a transmission portion which transmits the transmission signal modulated by the modulation portion by using a transmission power amount which corresponds to a modulation method used by the modulation portion; a traffic amount calculation portion which calculates a traffic amount caused by the traffic signals received by the transmission signal reception portion at each predetermined unit time interval; an average traffic amount calculation portion which calculates an average traffic amount that is an average of the traffic amount calculated by the traffic amount calculation portion in a nearest predetermined interval every time the traffic amount calculation portion calculates the traffic amount; and a modulation method setting portion which changes the modulation method based on the average traffic amount calculated by the average traffic amount calculation portion.

In accordance with the above-described aspects, the transmission power is controlled based on the average traffic amount which is an average of the traffic amount in the nearest predetermined interval from the present time, and thus, it is possible to avoid an increase of the transmission power due to temporal changes of the traffic amount. Therefore, it is possible to conduct an appropriate control of the transmission power.

BRIEF DESCRIPTION OF THE DRAWINGS

FIG. 2 is an outline block diagram showing a constitution of a priority operation portion.

FIG. 3 is an outline block diagram showing a constitution of a traffic amount analysis portion.

FIG. 4 is a drawing showing information stored by a relationship storage portion of the traffic amount analysis portion.

FIG. 5 is a drawing showing a determination method of a wireless transmission capacity conducted by a required band determination portion of the traffic amount analysis portion.

FIG. 8 is a drawing showing a concrete operation example of a wireless transmission apparatus.

DETAILED DESCRIPTION OF THE INVENTION

Hereinafter, in reference to the drawings, details of each embodiment are explained.

Figure 1:
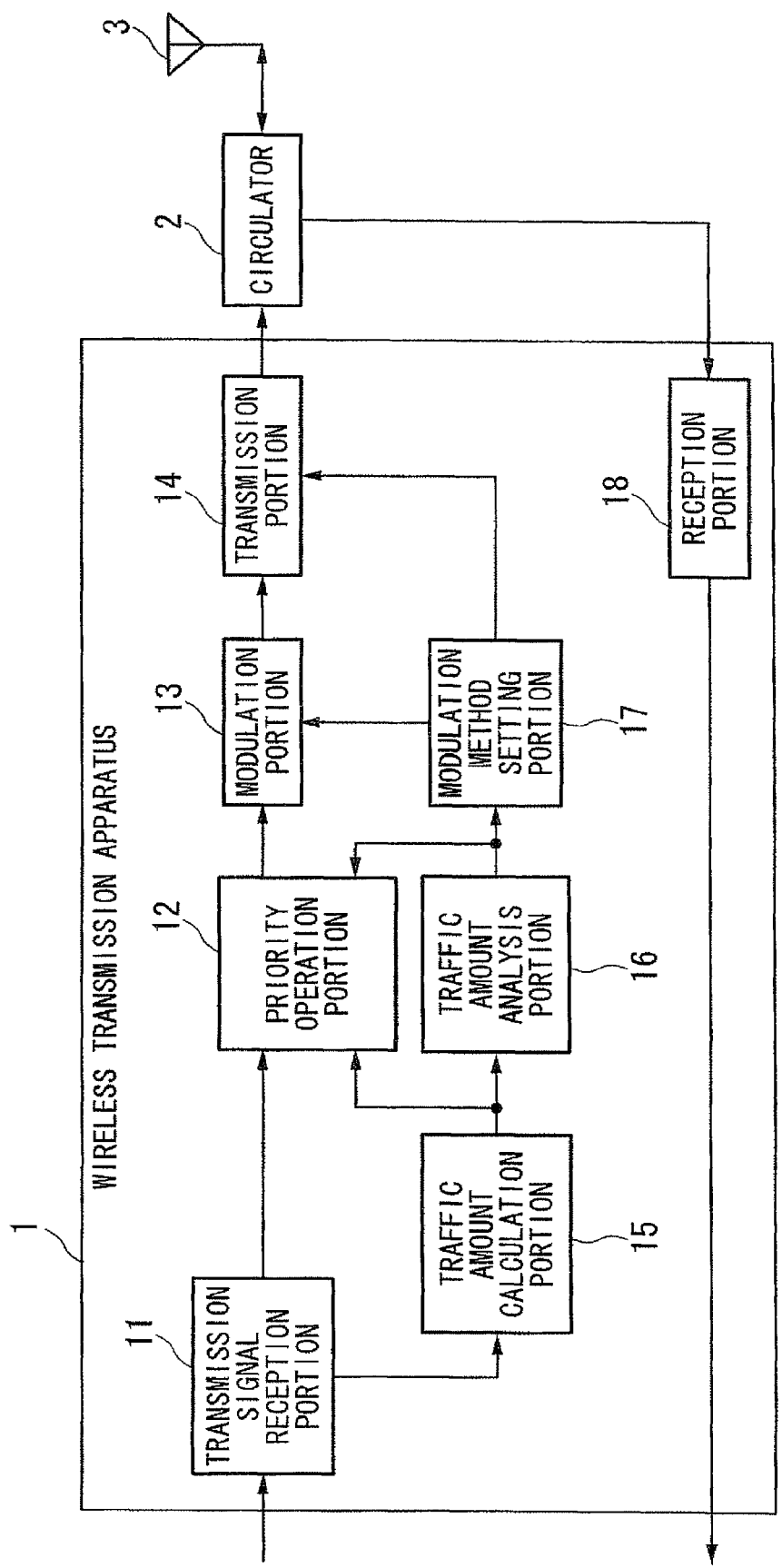
FIG. 1 is an outline block diagram showing a constitution of a wireless transmission apparatus of one embodiment.

FIG. 1 is an outline block diagram showing a constitution of a wireless transmission apparatus of one embodiment.

A wireless transmission apparatus 1 includes a transmission signal reception portion 11, a priority operation portion 12, a modulation portion 13, a transmission portion 14, a traffic amount calculation portion 15, a traffic amount analysis portion 16, a modulation method setting portion 17 and a reception portion 18. In addition, the wireless transmission apparatus 1 switches transmission and reception by using an antenna 3 via a circulator 2.

The transmission signal reception portion 11 receives a transmission signal from other apparatus via a wired transmission path and outputs the transmission signal to the priority operation portion 12 and the traffic amount calculation portion 15.

Based on priority information which indicates a transmission priority of the transmission signal and which is stored in the transmission signal, the priority operation portion 12 preferentially outputs the transmission signal to the modulation portion 13 if the transmission signal has a comparatively high priority.

The modulation portion 13 conducts a multiplexing operation on the transmission signal output from the priority operation portion 12 and generates a wireless signal by using a modulation method determined by the modulation method setting portion 17.

The transmission portion 14 transmits the wireless transmission signal generated by the modulation portion 13 via the circulator 2 and the antenna 3 by using a transmission power amount set by the modulation method setting portion 17.

Based on the transmission signal received from the traffic signal reception portion 11, the traffic amount calculation portion 15 calculates the traffic amount caused by the received transmission signal.

Based on the traffic amount calculated by the traffic amount calculation portion 15, the traffic amount analysis portion 16 determines both the modulation method and the transmission power amount for transmitting the transmission signal by using wireless transmission capacity required for transmitting the transmission signal.

The modulation method setting portion 17 notifies the modulation method and the transmission power amount determined by the traffic amount analysis portion 16 of both the modulation portion 13 and the transmission portion 14.

The reception portion 18 receives a wireless signal caught by the antenna 3 via the circulator 2.

FIG. 2 is an outline block diagram showing a constitution of the priority operation portion.

The priority operation portion 12 includes a priority detection portion 121 (transmission signal register portion), a transmission buffer portion 122 and a pickup portion 123. The transmission buffer portion 122 includes a high priority storing area 122-1 and a low priority storing area 122-2 as storage areas.

Based on the priority information of the transmission signal output from the transmission signal reception portion 11, the priority detection portion 121 detects a level of the transmission priority of the transmission signal. Further, the priority determination portion 121 registers the transmission signal to the high priority storage area 122-1 if the transmission priority is high and registers the transmission signal to the low priority storage area 122-2 if the transmission priority is low. Here, it should be noted that the transmission priority indicates one of "high" and "low".

The pickup portion 123 picks up the transmission signal which is registered at the first position from the transmission buffer 122 and outputs the transmission signal to the modulation portion 13. In such an operation, if the transmission signal is stored in the high priority storage area 122-1, the pickup portion 123 picks up the transmission signal registered at the first position of the high priority storage area 122-1. On the other hand, if no transmission signal is stored in the high priority storage area 122-1, the pickup portion 123 picks up the transmission signal registered at the first position of the low priority storage area 122-2. Here, "pick up" means an operation of reading information form a storage area and removing the read information from the storage area. Further, hereinafter, "pick up" is used as a term having the same meaning.

FIG. 3 is an outline block diagram showing a constitution of the traffic amount analysis portion.

The traffic amount analysis portion 16 includes an average traffic calculation portion 161, an integrated traffic amount calculation portion 162, a required band determination portion 163 (maximum acceptable traffic amount read portion, minimum acceptable traffic amount read portion, first modulation method setting portion, second modulation method setting portion, third modulation method setting portion and fourth modulation method setting portion) and a relationship storage portion 164.

The average traffic amount calculation portion 161 calculates an average traffic amount which is an average value of the traffic amount calculated by the traffic amount calculation portion 15 in the nearest predetermined interval from the present time.

Based on the traffic amount calculated by the traffic amount calculation portion 15, the integrated traffic calculation portion 162 calculates the traffic amount exceeding the current wireless transmission capacity.

Based on the traffic amount, the average traffic amount and the integrated traffic amount, the required band determination portion 162 determines the modulation method and the transmission power amount.

The relationship storage portion 164 memorizes the wireless transmission capacity, the modulation method for conducting a transmission within the wireless transmission capacity, the acceptable transmission amount which indicates the traffic amount that can be transmitted by using the modulation method and the transmission power amount which is required for transmission by using the modulation method while establishing a linkage therebetween. Further, as the acceptable traffic amount, both an upper limit value (maximum acceptable traffic amount) which is the largest value of the traffic amount that can be transmitted by using the linked modulation method and a lower limit value (minimum acceptable traffic amount) which is an upper limit value of a traffic amount linked with a modulation method with the secondary largest upper limit value next to the above-described modulation method are memorized.

FIG. 4 is a drawing showing information stored by a relationship storage portion of the traffic amount analysis portion.

As shown in FIG. 4, the relationship storage portion 164 establishes and memorizes a linkage between the wireless transmission capacity, the modulation method, the upper limit value and the lower limit value of the acceptable traffic amount and the transmission power amount. It should be noted that the more the wireless transmission capacity is, the more values of the multi-level number of the modulation method, the acceptable traffic amount and the transmission power amount become.

In an example shown in FIG. 4, c1 is the smallest value and c3 is the largest value of the wireless transmission capacity. Therefore, the lower limit value of the acceptable traffic amount corresponding to c2 is th1 which is the largest value between the upper limit values which are smaller than th2 and which are linked to other modulation methods. Similarly, the upper limit value of the acceptable traffic amount corresponding to c2 is the same value as th2 which is the lower limit value of the acceptable traffic amount corresponding to c3.

Here, between the wireless transmission capacities stored in the relationship storage portion 164, the wireless transmission amount which is the smallest value among the wireless transmission amounts larger than a transmission capacity A is called "wireless transmission amount larger than the wireless transmission capacity A by one step". Thus, in FIG. 4, the wireless transmission capacity c2 is larger than the wireless transmission capacity c1 by one step.

Further, between the wireless transmission capacities stored in the relationship storage portion 164, the wireless transmission amount which is the largest value among the wireless transmission amounts smaller than a transmission capacity A is called "wireless transmission amount smaller than the wireless transmission capacity A by one step". Thus, in FIG. 4, the wireless transmission capacity c2 is smaller than the wireless transmission capacity c3 by one step.

FIG. 5 is a drawing showing a determination method of a wireless transmission capacity conducted by the required band determination portion of the traffic amount analysis portion.

If both the traffic amount calculated by the traffic amount calculation portion 15 and the average traffic amount calculated by the average traffic amount calculation portion 161 of the traffic amount analysis portion 16 exceed the upper limit value of the acceptable traffic amount linked to the modulation method which is currently used by the modulation portion 13, the required band determination portion 163 determines to change the wireless transmission capacity so as to be larger than the current wireless transmission capacity by one step.

On the other hand, if one of the traffic amount calculated by the traffic amount calculation portion 15 and the average traffic amount calculated by the average traffic amount calculation portion 161 of the traffic amount analysis portion 16 is lower than the lower limit value of the acceptable traffic amount linked to the modulation method which is currently used by the modulation portion 13, the required band determination portion 163 determines to change the wireless transmission capacity so as to be smaller than the current wireless transmission capacity by one step.

Further, if the integrated traffic amount calculated by the integrated traffic amount calculation portion 162 of the traffic amount analysis portion 16 exceeds the capacity that can be stored in the transmission buffer 122 of the priority operation portion 12, the required band determination portion 163 determines to change the wireless transmission capacity so as to be larger than the current wireless transmission capacity by one step.

However, after changing the modulation method based on the integrated traffic amount, unless the average traffic amount becomes larger than the lower limit value of the acceptable traffic amount which is read by the required band determination portion 163, change of the wireless transmission capacity is skipped or inhibited regardless of a case in which the average traffic amount becomes lower than the lower limit value linked to the modulation method currently used by the modulation portion 13. It should be noted that the wireless transmission capacity is changed if the traffic amount is lower than the lower limit value.

After this, in this embodiment, the transmission signal reception portion 11 receives the transmission signal and registers the transmission signal to the transmission buffer portion 122 of the priority operation portion 12, the modulation portion 13 picks up the transmission signal which is stored at the first position of the transmission buffer 122 and modulates the transmission signal, and the transmission portion 14 transmits the transmission signal modulated by the modulation portion 13 by using the transmission power amount corresponding to the modulation method used by the modulation portion 13. On the other hand, the traffic amount calculation portion 15 calculates the traffic amount generated by the transmission signal received by the transmission signal reception portion 11 every predetermined unit time interval, and each time the traffic amount calculation portion 15 calculates the traffic amount, the average traffic amount calculation portion 161 of the traffic amount analysis portion 16 calculates the average traffic amount which is the average of the traffic amount calculated by the traffic amount calculation portion 15 in the nearest predetermined interval from the present time. After this, the required band determination portion 163 of the traffic amount analysis portion 16 changes the modulation method based on the average traffic amount calculated by the average traffic amount calculation portion 161.

Thus, it is possible for the wireless transmission apparatus 1 to appropriately control the transmission power amount.

Hereinafter, an operation of the wireless transmission apparatus 1 of this embodiment is explained.

Figure 6:
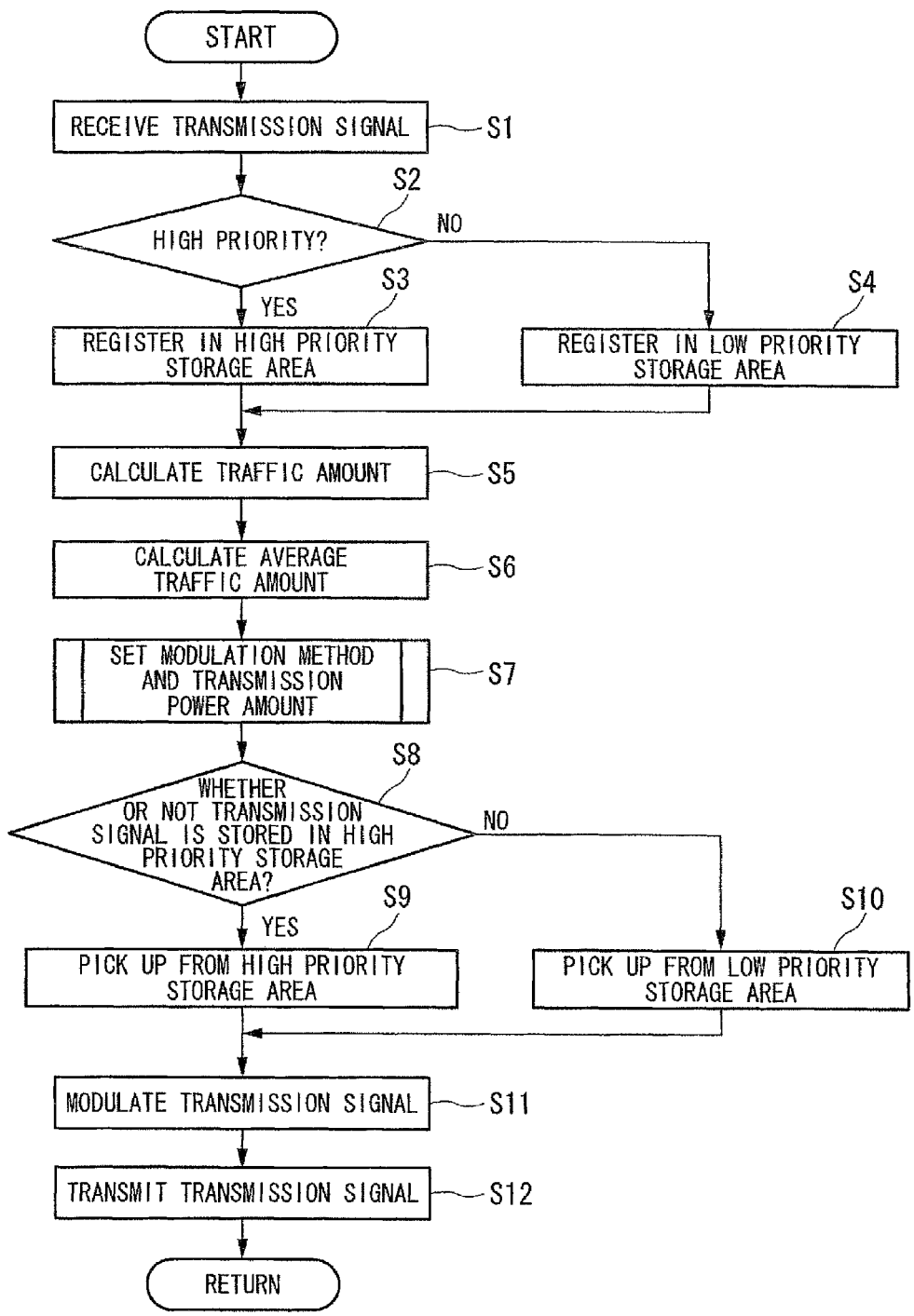
FIG. 6 is a flowchart showing an operation of a wireless transmission apparatus.

FIG. 6 is a flowchart showing an operation of the wireless transmission apparatus.

When a packetized transmission signal via a prioritized transmission path is received by the wireless transmission apparatus 1, the transmission signal reception portion 11 receives the transmission signal (STEP S1). After this, the priority determination portion 121 of the priority operation portion 12 determines whether the transmission priority of the received transmission signal is high or low (STEP S2). Here, for example, it is possible to determine the transmission priority as "high" if a value identified by PCP (Priority Code Point) regulated in IEEE802.1Q is 4 or larger, and it is possible to determine the transmission priority as "low" if a value identified by PCP is 3 or smaller.

The priority determination portion 121 registers the packet data of the transmission signal to the high priority storage area 122-1 (STEP S3) if the transmission priority of the transmission signal is determined as "high" (STEP S2: YES). On the other hand, the priority determination portion 121 registers the packet data of the transmission signal to the low priority storage area 122-1 (STEP S4) if the transmission priority of the transmission signal is determined as "low" (STEP S2: NO).

When the priority determination portion 121 registers the packet data to the transmission buffer portion 122 at STEP S3 or S4, the traffic amount calculation portion 15 calculates the traffic amount caused by the traffic signal received by the transmission signal reception portion 11 at STEP S1 (STEP S5). Here, a calculation of the traffic amount means a calculation of the total amount of the traffic signals which have been received by the transmission signal reception portion 11 in a predetermined unit time. It should be noted that every time the transmission signal is received at STEP S1, operations of STEPS S1-S4 described above are conducted, and operations of and after STEP S5 are conducted every predetermined unit time interval described above.

After calculating the traffic amount of the unit time by the traffic amount calculation portion 15, the average traffic amount calculation portion 161 of the traffic amount analysis portion 16 calculates the average traffic amount which is the average of the traffic amount calculated by the traffic amount calculation portion 15 in the nearest predetermined interval from the present time (STEP S6).

Here, in reference to a concrete example, a calculation method of the average traffic amount is explained. If the predetermined time interval is 10 unit time, the average traffic amount calculation portion 161 stores a queue with a size of 10 in an internal memory. When the traffic amount calculation portion 15 calculates the traffic amount, the average traffic amount calculation portion 161 picks up the traffic amount which is stored at a first place of the queue and registers a newly calculated traffic amount to the queue. After this, an average of the 10 set of the traffic amount stored in the queue is calculated as an average traffic amount. By conducting such operations, it is possible to calculate the average traffic amount.

After calculating the average traffic amount by the average traffic amount calculation portion 161 at STEP S6, the required band determination portion 163 determines the wireless transmission amount based on the determination method shown in FIG. 5, and the modulation method setting portion 17 conducts operations for setting the modulation method and the transmission power amount corresponding to the wireless transmission amount (STEP S7). Details of operations of determining the modulation method and the transmission power amount are explained later.

When the required band determination portion 163 and the modulation method setting portion 17 set the modulation method and the transmission power amount, the pickup portion 123 of the priority operation portion 12 determines whether or not a transmission signal is stored in the high priority storage portion 122-1 of the transmission buffer portion 122 (STEP S8).

When the pickup portion 123 determines that the transmission signal is stored in the high priority storage area 122-1 (STEP S8: YES), the pickup portion 123 picks up the transmission signal from the high priority storage area 122-1 (STEP S9). On the other hand, when the pickup portion 123 determines that the transmission signal is not stored in the high priority storage area 122-1 (STEP S8: NO), the pickup portion 123 picks up the transmission signal from the low priority storage area 122-2 (STEP S10). In other words, the pickup portion 123 picks up the transmission signal from the storage area storing the transmission signals with higher priority between the storage areas.

It should be noted that in operations of STEPs S8 to S10, the pickup portion 123 picks up the transmission signal of the amount which can be transmitted by using the modulation method determined at STEP S7, in other words, the traffic signal of the amount smaller than the upper limit of the acceptable traffic amount. Therefore, if the traffic amount exceeds the upper limit value of the acceptable traffic amount corresponding to the currently used modulation method, the wireless transmission apparatus 1 temporally stores the transmission signal in the transmission buffer 122 and preferentially transmits the transmission signals with high priority.

After picking up the transmission signal by the pickup portion 123 at STEPs S8 to S10, the modulation portion 13 modulates the picked up transmission signal by using the modulation method determined at STEP S7 (STEP S11). After this, the transmission portion 14 transmits the modulated transmission signal by using the transmission power amount determined at STEP S7 (STEP S12).

Hereinafter, operations of determining the modulation method and the transmission power amount at STEP S7 are explained.

Figure 7:
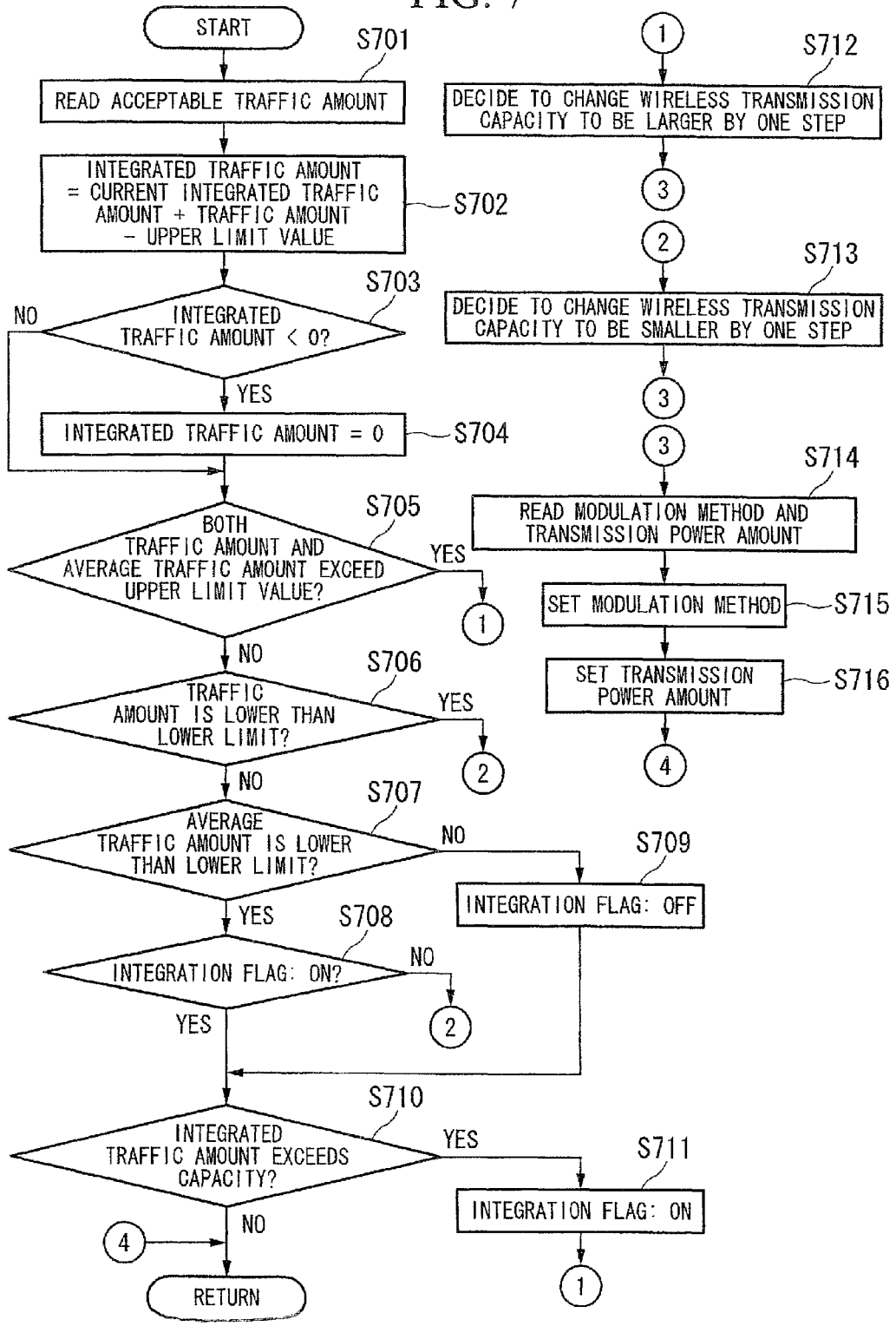
FIG. 7 is a flowchart showing an operation of determining a modulation method and a transmission power amount by a wireless transmission apparatus.

FIG. 7 is a flowchart showing an operation of determining a modulation method and a transmission power amount by the wireless transmission apparatus.

After calculation of the average traffic amount by the average traffic amount calculation portion 161 of the traffic amount analysis portion 16 at STEP S6, the required band determination portion 163 reads the acceptable traffic amount (upper and lower limit values) corresponding to the current wireless transmission amount from the relationship storage portion 164 (STEP S701). It should be noted that the current wireless transmission amount has been registered in the internal memory of the required band determination portion 163 due to previous operations of STEP S7.

After this, the integrated traffic amount calculation portion 162 adds the integrated traffic amount stored in the internal memory and the traffic amount calculated by the traffic amount calculation portion 15, subtracts the upper limit value of the acceptable traffic amount and updates the integrated traffic amount stored in the internal memory with the calculated value (STEP S702). The integrated traffic value calculated in this operation indicates the data amount of the transmission signal which is going to be stored in the transmission buffer portion 122.

Here, a reason why the integrated traffic amount indicates the data amount of the transmission signal which is going to be stored in the transmission buffer portion 122 is explained.

First, the integrated traffic amount calculation portion 162 adds the integrated traffic amount stored in the internal memory and the traffic amount calculated by the traffic amount calculation portion 15. It should be noted that an initial value of the integrated traffic amount is 0. In accordance with such an operation, it is possible to calculate the current data amount of the transmission buffer portion 122 in accordance with the above-described operations of storing the transmission signal of STEPs S1 to S4. After this, the integrated traffic amount calculation portion 162 subtracts the upper limit value of the acceptable traffic amount read by the required band determination portion 163 from a value indicating the current data amount of the transmission buffer portion 122. In accordance with such an operation, the data amount of the transmission buffer 122 after picking up the transmission signal due to the above-described operations of STEPs S8-S10 is calculated based on the current modulation method.

After updating the integrated traffic amount at STEP S702, the integrated traffic amount calculation portion 162 determines whether or not the integrated traffic amount is smaller than 0 (STEP S703). If the integrated traffic amount is smaller than 0 (STEP S703: YES), the integrated traffic amount calculation portion 162 updates the integrated traffic amount with 0 (STEP S704).

In other words, if a sum of the integrated traffic amount before update at STEP S702 and the traffic amount calculated by the traffic amount calculation portion 15 is less than the upper limit value of the acceptable traffic amount, the integrated traffic amount calculated at STEP S702 is a value less than 0. However, in a concrete case, the integrated traffic amount stored in the transmission buffer portion 122 cannot be minus, and due to this, the integrated traffic amount is corrected so as to be 0 by the operation of STEP S704.

After updating the integrated traffic amount by the integrated traffic amount calculation portion 162 in accordance with operations of STEPs S702-S704, the required band determination portion 163 determines whether or not both the traffic amount calculated by the traffic amount calculation portion 15 and the average traffic amount calculated by the average traffic amount calculation portion 161 of the traffic amount analysis portion 16 exceed the upper limit value of the acceptable traffic amount read at STEP S701 (STEP S705).

If the required band determination portion 163 determines that at least one of the traffic amount and the average traffic amount does not exceed the upper limit value of the acceptable traffic amount (STEP S705: NO), the required band determination portion 163 determines whether or not the traffic amount calculated by the traffic amount calculation portion 15 is lower than the lower limit value of the acceptable traffic amount read at STEP S701 (STEP S706).

If the required band determination portion 163 determines that the traffic amount is not lower than the lower limit value of the acceptable traffic amount (STEP S706: NO). the required band determination portion 163 determines whether or not the average traffic amount calculated by the average traffic amount calculation portion 161 is lower than the lower limit value of the acceptable traffic amount read at STEP S701 (STEP S707).

If the required band determination portion 163 determines that the average traffic amount is lower than the lower limit value of the acceptable traffic amount (STEP S707: YES), the required band determination portion 163 determines whether or not an integration flag which indicates whether or not the modulation method is changed in accordance with prior operations based on the integration traffic amount is ON (STEP S708). It should be noted that an initial value of the integration flag is OFF.

On the other hand, at STEP S707, if the required band determination portion 163 determines that the average traffic amount is not lower than the lower limit value of the acceptable traffic amount (STEP S707: NO), the required band determination portion 163 sets the integration flag stored in the internal memory to OFF (STEP S709).

If the required band determination portion 163 determines that the integration flag is ON (STEP S708: YES), or if the required band determination portion 163 sets the integration flag to OFF, then the required band determination portion 163 determines whether or not the integrated traffic amount stored in the internal memory by the integrated traffic amount calculation portion 162 exceeds the capacity of the transmission buffer 122 (STEP S710).

If the required band determination portion 163 determines that the integrated traffic amount exceeds the capacity of the transmission buffer 122 (STEP S710: YES), the required band determination portion 163 sets the integration flag stored in the internal memory to ON (STEP S711).

On the other hand, if the required band determination portion 163 determines that the integrated traffic amount does not exceed the capacity of the transmission buffer 122 (STEP S710: NO), the required band determination portion 163 finishes the operation without changing the wireless transmission capacity.

Here, at STEP S705, if the required band determination portion 163 determines that both the traffic amount and the average traffic amount exceed the upper limit value of the acceptable traffic amount (STEP S705: YES), or if the required band determination portion 163 set the integration flag to ON at STEP S711, then the required band determination portion 163 decides to change the wireless transmission capacity to be larger than the current wireless transmission capacity larger by one step (STEP S712).

On the other hand, if the required band determination portion 163 determines that the traffic amount is lower than the lower limit value of the acceptable traffic amount (STEP S706: NO). or if the required band determination portion 163 determines that the integration flag is OFF (STEP S708: NO), then the required band determination portion 163 decides to change the wireless transmission capacity to be smaller than the current wireless transmission capacity smaller by one step (STEP S713).

It should be noted that when the wireless transmission capacity is changed at STEP S712 or S713, the required band determination portion 163 updates the wireless transmission capacity which is going to be stored in the internal memory with the wireless transmission capacity determined at STEP S712 or S713.

When the required band determination portion 163 determines the wireless transmission capacity at STEP S712 or S713, the required band determination portion 163 reads the modulation method and the transmission power amount which is linked to the determined wireless transmission capacity from the relationship storage portion 164 (STEP S714). After this, the modulation method setting portion 17 sets the modulation method used by the modulation portion 13 to change to the modulation method read by the required band determination portion 163 (STEP S715). In addition, the modulation method setting portion 17 sets the transmission power amount of the transmission portion 14 to the transmission power amount read by the required band determination portion 163 (STEP S716).

In accordance with such an operation, it is possible to determine the wireless transmission capacity based on the conditions shown in FIG. 5 and to set both the modulation method and the transmission power amount.

Here, a reason why it is possible to appropriately control the transmission power amount by determining the wireless transmission capacity based on the conditions shown in FIG. 5.

First, in this embodiment, if both the traffic amount and the average traffic amount exceed the upper limit value of the acceptable traffic amount, a decision is made in which the wireless transmission capacity is changed to be larger than the current wireless transmission capacity by one step. In other words, the wireless transmission capacity is not changed if only the traffic amount exceeds the upper limit of the acceptable traffic amount. Due to this, it is possible to prevent the transmission power amount from increasing in accordance with a temporal or instant increase of the traffic amount, and it is possible to keep the transmission power amount to be comparatively small value.

Further, in this embodiment, if one of the traffic amount and the average traffic amount is lower than the lower limit value of the acceptable traffic amount, a decision is made in which the wireless transmission capacity is changed to be smaller than the current wireless transmission capacity by one step. Due to this, the transmission power amount is reduced in accordance with reduction of the traffic amount, and therefore, it is possible to keep the transmission power amount to be a small value.

Further, in this embodiment, if the integrated traffic amount exceeds the capacity that can be stored in the transmission buffer 122, a decision is made to change the wireless transmission capacity so as to be larger than the current wireless transmission capacity by one step. Due to this, it is possible to increase amount of the transmission signal which is picked up by the pickup portion 123 of the priority operation portion 12, and therefore, the pickup portion 123 can immediately pick up the transmission signal stored in the transmission buffer 122 when it is not possible for the transmission buffer portion 122 to store the transmission signal.

It should be noted that in this embodiment, after changing the modulation method based on the integrated traffic amount, unless the average traffic amount becomes larger than the lower limit value of the acceptable traffic amount read by the required band determination portion 163, change of the wireless transmission capacity is skipped or inhibited regardless of whether or not the average traffic amount is smaller than the lower limit value of the acceptable traffic amount. Right after changing the modulation method based on the integrated traffic amount, the average traffic amount is smaller than the lower limit value of the acceptable traffic amount read by the required band determination portion 163. Therefore, it is possible to prevent the wireless transmission capacity from being the previous value right after changing the modulation method based on the integrated traffic amount because change of the wireless transmission capacity is skipped or inhibited until when exceeding the lower limit value of the acceptable traffic amount read by the required band determination portion 163.

Hereinafter, a managing operation of the wireless transmission capacity of this embodiment is explained in reference to concrete examples.

FIG. 8 is a drawing showing a concrete operation example of the wireless transmission apparatus.

FIG. 8(a) is a graph showing changes of the traffic amount flowing into the wireless transmission apparatus 1 and the average traffic amount. Here, the horizontal axis indicates time and the vertical axis indicates a traffic amount.

Hereinafter, operations of the wireless transmission apparatus 1 are explained in which the data of the traffic amount shown in FIG. 8(a) is received.

First, from time t0 to time t1, the wireless transmission apparatus 1 transmits transmission signals by using the wireless transmission capacity c1 shown in FIG. 5. In other words, the modulation portion 13 conducts a modulation operation by using the modulation method m1, and the transmission portion 14 conducts a transmission operation by using a wireless transmission power p1. Further, from the time t0 to the time t1, the traffic amount of the transmission signals received by the transmission signal reception portion 11 in every unit time interval is less than the acceptable traffic amount of the wireless transmission capacity c1. Therefore, in operations of STEPs S8-S19, the pickup portion 123 picks up all transmission signals stored in the transmission buffer portion 122 in every unit time interval.

At time t1, the traffic amount of the traffic signals received by the transmission signal reception portion 11 exceeds the upper limit value th1 of the acceptable traffic amount of the wireless transmission capacity c1. Therefore, in operations of STEPs S8 to S10, the pickup portion 123 picks up the transmission signals of an amount that can be picked up by using the modulation method m1, and the traffic signals exceeding the upper limit value th1 of the acceptable traffic amount are stored in the transmission buffer portion 122. A shaded area 47 of FIG. 8(a) indicates the amount of transmission signals stored in the transmission buffer portion 122.

At time t2, the average traffic amount calculated by the average traffic amount calculation portion 161 of the traffic amount analysis portion 16 exceeds the upper limit value th1 of the acceptable traffic amount of the wireless transmission capacity c1. In other words, both the traffic amount and the average traffic amount exceeds the upper limit value, and due to this, in accordance with operations of STEPs S705 and S721, the required band determination portion 163 determines to change the wireless transmission capacity so as to be c2 which is larger than c1 by one step. Therefore, the modulation method setting portion 17 sets the modulation method of the modulation portion 13 to m2 and sets the wireless transmission power of the transmission portion 14 to p2. Further, due to this, the traffic amount of the transmission signals received by the transmission signal reception portion 11 in a unit time interval becomes lower than the acceptable traffic amount of the wireless transmission capacity c2. Therefore, the amount of the transmission signals picked up by the pickup portion 123 in the operations of STEPs S8 to S19 increases, and the amount of the transmission signals stored in the transmission buffer portion 122 after time t2 is reduced.

At time t3, the traffic amount of the transmission signals received by the transmission signal reception portion 11 is lower than the lower limit value th1 of the acceptable traffic amount of the wireless transmission capacity c2. Therefore, in accordance with operations of STEPs S707 and S713, the required band determination portion 163 determines to change the wireless transmission capacity so as to be c1 which is smaller than c2 by one step. Therefore, the modulation method setting portion 17 sets the modulation method of the modulation portion 13 to m1 and sets the wireless transmission power of the transmission portion 14 to p1.

At time t4, the traffic amount of the transmission signals received by the transmission signal reception portion 11 exceeds the upper limit value th1 of the acceptable traffic amount of the wireless transmission capacity c1. In other words, both the traffic amount and the average traffic amount exceeds the upper limit value, and due to this, in accordance with operations of STEPs S705 and S721, the required band determination portion 163 determines to change the wireless transmission capacity so as to be c2 which is larger than c1 by one step. Therefore, the modulation method setting portion 17 sets the modulation method of the modulation portion 13 to m2 and sets the wireless transmission power of the transmission portion 14 to p2.

At time t5, the traffic amount of the transmission signals received by the transmission signal reception portion 11 exceeds the upper limit value th2 of the acceptable traffic amount of the wireless transmission capacity c2. Therefore, in operations of STEPs S8 to S10, the pickup portion 123 picks up the transmission signals of an amount that can be picked up by using the modulation method m2, and the traffic signals exceeding the upper limit value th2 of the acceptable traffic amount are stored in the transmission buffer portion 122. A shaded area 48 of FIG. 8(a) indicates the amount of transmission signals stored in the transmission buffer portion 122.

At time t6, the amount of the transmission data stored in the transmission buffer portion 122 exceeds the capacity of the transmission buffer portion 122. In other words, the integrated traffic amount calculated by the integrated traffic amount calculation portion 162 of the traffic amount analysis portion 16 exceeds the capacity of the transmission buffer portion 122. Therefore, in accordance with operations of STEPs S710 and S712, the required band determination portion 163 determines to change the wireless transmission capacity so as to be c3 which is larger than c2 by one step. Therefore, the modulation method setting portion 17 sets the modulation method of the modulation portion 13 to m3 and sets the wireless transmission power of the transmission portion 14 to p3. Further, due to this, the traffic amount of the transmission signals received by the transmission signal reception portion 11 in every unit time interval becomes lower than the acceptable traffic amount of the wireless transmission capacity c2. Therefore, the amount of the transmission signals picked up by the pickup portion 123 in the operations of STEPs S8 to S19 increases, and the amount of the transmission signals stored in the transmission buffer portion 122 after time t6 is reduced.

Further, here, in accordance with the operation of STEP S711, the required band determination portion 163 sets the integration flag stored in the internal memory to ON. In accordance with such operations, during time t6 to t7 in which the average traffic amount is lower than the lower limit value th2 of the acceptable traffic amount of the wireless transmission capacity c3, the modulation method setting portion 17 skips or inhibits change of the modulation method of the modulation portion 13 from m3 to m2.

At time t7, the average traffic amount calculated by the average traffic amount calculation portion 161 of the traffic amount analysis portion 16 exceeds the upper limit value th2 of the acceptable traffic amount of the wireless transmission capacity c3. Therefore, in accordance with the operation of STEP S709, the required band determination portion 163 sets the integration flag stored in the internal memory to OFF.

At time t8, the traffic amount of the transmission signals received by the transmission signal reception portion 11 is lower than the lower limit value th2 of the acceptable traffic amount of the wireless transmission capacity c3. Here, in accordance with operations of STEPs S707 and S713, the required band determination portion 163 determines to change the wireless transmission capacity so as to be c2 which is smaller than c3 by one step because the integration flag is OFF. Therefore, the modulation method setting portion 17 sets the modulation method of the modulation portion 13 to m2 and sets the wireless transmission power of the transmission portion 14 to p2.

FIG. 8(b) is a graph showing changes of the transmission power amount of the wireless transmission apparatus 1 of this embodiment. Here, the horizontal axis indicates time and the vertical axis indicates a transmission power amount.

By conducting the above-described operations, the wireless transmission apparatus 1 controls the transmission power amount as shown in FIG. 8(b).

FIG. 8(c) is a graph showing changes of the transmission power amount based on a conventional control method of the transmission power. Here, a horizontal axis indicates time and a vertical axis indicates a transmission power amount.

It should be noted that the conventional control method of the transmission power does not calculate the average traffic amount, determines to change the wireless transmission capacity so as to be a value which is larger by one step if the traffic amount exceeds the upper limit value of the acceptable traffic amount, and determines to change the wireless transmission capacity so as to be a value which is smaller by one step if the traffic amount is lower than the lower limit value of the acceptable traffic amount.

In accordance with an operation based on the conventional control method, first, at the time t1, the traffic amount exceeds the upper limit value th1 of the acceptable traffic amount, and due to this, it is decided to set the wireless transmission capacity to c2. After this, at the time t3, the traffic amount is lower than the lower limit value th1 of the acceptable traffic amount, and die to this, it is decided to set the wireless transmission capacity to c1. Further, at the time t4, the traffic amount exceeds the upper limit value th1 of the acceptable traffic amount, and due to this, it is decided to set the wireless transmission capacity to c2. Furthermore, at the time t5, the traffic amount exceeds the upper limit value th3 of the acceptable traffic amount, and due to this, it is decided to set the wireless transmission capacity to c3. After this, at the time t8, the traffic amount exceeds the upper limit value th2 of the acceptable traffic amount, and due to this, it is decided to set the wireless transmission capacity to c2.

Therefore, when the transmission power amount of the wireless transmission apparatus 1 of this embodiment is compared to the transmission power amount based on the conventional control method, as shown in shaded areas of FIG. 8(c), between the time t1 and t2 and between the time t5 and t6, the transmission power amount of the wireless transmission apparatus 1 of this embodiment is less than the transmission power amount based on the conventional control method. In other words, it is understood that the wireless transmission apparatus 1 of this embodiment can more appropriately control the transmission power amount than the conventional control method.

One embodiment of the present invention is explained above in reference to the drawings, on the other hand, the above description is not a limitation to a concrete constitution, and it is possible to include, for example, various design changes if there is no deviation from the idea or concept of the present invention.

For example, in this embodiment, a case is explained in which the average traffic amount calculation portion 161 of the traffic amount analysis portion 16 calculates the average traffic amount of all transmission signals regardless of a level of the transmission priority, and in which the wireless transmission capacity is determined by the required band determination portion 163 based on the calculated average traffic amount. However, this is not a limitation. For example, it is possible for the average traffic amount calculation portion 161 to calculate the average traffic amount of only the transmission signals with a high transmission priority, and it is possible for the required band determination portion 163 to determine the wireless transmission capacity based on the calculated average traffic amount. In accordance such a change, it is possible to maintain the wireless transmission capacity which is the minimum and necessary amount and which is the size that causes no delay of the transmission signals with high transmission priority.

It should be noted that in this embodiment, the priority determination portion of the priority operation portion determines whether high or low the transmission priority is and made a decision whether the registration is conducted on the high priority storage area 122-1 of the low priority storage area 122-2 of the transmission buffer portion 122 based on the determination result. However, this is not a limitation.

For example, it is possible to divide the transmission priority into three or more levels and to register the transmission signals to a storage area corresponding to the transmission priority. In such a case, the pickup portion 123 picks up the transmission signal which is stored at the first position from the storage area storing the transmission signals with the highest priority among the storage areas of the transmission buffer portion 122 storing the transmission signals.

Further, for example, it is possible to pick up the transmission signal which is stored at the first position of the transmission buffer portion 122 by the pickup portion 123 regardless of the transmission priority.

It should be noted that in this embodiment, an example is explained in which the integration flag is changed to ON when the required band determination portion 163 determines that the integrated traffic amount exceeds the capacity of the transmission buffer 122. However, this is not a limitation, and it is possible to change the integration flag to ON when exceeding another threshold, for example, it is possible to change the integration flag to ON when it is determined that the integrated traffic amount exceeds 90% of the capacity of the transmission buffer 122.

Further, in this embodiment, an example is explained in which, at STEP S707, the required band determination portion 163 of the traffic amount analysis portion 16 changes the integration flag to OFF only when the average traffic amount is lower than the lower limit value. However, this is not a limitation. For example, in addition to a case in which the average traffic amount is lower than the lower limit value, it is possible for the required band determination portion 163 to change the integration flag to OFF when the integrated traffic amount is 0 or when the integrated traffic amount is lower than a predetermined threshold. Further, in such cases, it is possible for the required band determination portion 163 to change the wireless transmission capacity so as to be the wireless transmission capacity which is smaller by one step when changing the integration flag to OFF.

Further, in this embodiment, an example is explained in that the integrated traffic amount calculation portion 162 of the traffic amount analysis portion 16 calculates the integrated traffic amount which indicates the data amount of the transmission signals stored in the transmission buffer portion 122 based on the traffic amount and the upper limit value of the acceptable traffic amount. However, this is not a limitation, and for example, it is possible for the integrated traffic amount calculation portion 162 to monitor the transmission buffer portion 122 and outputs the data amount stored by the transmission buffer portion 122 as the integrated traffic amount.

Further, in this embodiment, a case is explained in which the relationship storage portion 164 of the traffic amount analysis portion stores the lower limit value of the acceptable traffic amount, and the required band determination portion 163 determines the wireless transmission amount based on this lower limit value. However, this is not a limitation, and it is possible that, for example, the relationship storage portion 164 stores the upper limit value of the acceptable traffic amount and does not store the lower limit value. In such a case, the required band determination portion 163 reads the upper limit value linked to other modulation method which is the largest value between one or multiple values of the maximum acceptable traffic amount that are smaller than the acceptable traffic amount linked to the current wireless transmission capacity and which is read as the lower limit value of the acceptable traffic amount, determines the wireless transmission amount based on this lower limit value, and due to this, it is possible to conduct an equivalent operation.

The above-described wireless transmission apparatus 1 internally includes a computer system. Further, operational steps of the above-described operation portions stored in a registration medium which is computer readable in a form of a computer program, and the computer conducts the above-described operations by reading and executing the computer program. Here, the computer readable registration medium is, for example, a magnetic disc, a magneto-optical disc, CD-ROM, DVD-ROM and a semiconductor memory. Furthermore, it is possible to distribute the computer program to computers via communication lines and to execute the computer program by the computers which receive the computer program.

Further, it is possible for the above-described computer program to perform a portion of the above-described functions. Furthermore, so-called differential files (differential programs) can be used that can perform the above-described functions when combined with computer programs which are already registered in a computer system.

In accordance with the above-described embodiment, it is possible to provide with a wireless transmission apparatus, a wireless transmission method and a computer program that appropriately control the transmission power.

INDUSTRIAL APPLICABILITY

The present invention can be applied to, for example, a wireless transmission apparatus which appropriately controls the transmission power.

DESCRIPTION OF THE REFERENCE SYMBOLS

1 . . . wireless transmission apparatus
2 . . . circulator
3 . . . antenna
11 . . . transmission signal reception portion
12 . . . priority operation portion
13 . . . modulation portion
14 . . . transmission portion
15 . . . traffic amount calculation portion
16 . . . traffic amount analysis portion
17 . . . modulation method setting portion
18 . . . reception portion
121 . . . priority determination portion
122 . . . transmission buffer portion
122-1 . . . high priority storage area
122-2 . . . low priority storage area
123 . . . pickup portion
161 . . . average traffic amount calculation portion 162 . . . integrated traffic amount calculation portion
163 . . . required band determination portion
164 . . . relationship storage portion

The invention claimed is:

1. A wireless transmission apparatus for transmitting transmission signals via wireless transmission paths, comprising:
a transmission signal reception portion receiving transmission signals;
a transmission signal registration portion registering the transmission signals received by the transmission signal reception portion to a transmission buffer portion;
a modulation portion which picks up a transmission signal registered at a first position between the transmission signals stored in the transmission buffer portion and which modulates the picked up transmission signal;
a transmission portion which transmits the transmission signal modulated by the modulation portion by using a transmission power amount which corresponds to a modulation method used by the modulation portion;
a traffic amount calculation portion which calculates a traffic amount caused by the traffic signals received by the transmission signal reception portion at each predetermined unit time interval;
an average traffic amount calculation portion which calculates an average traffic amount that is an average of the traffic amount calculated by the traffic amount calculation portion in a nearest predetermined interval every time the traffic amount calculation portion calculates the traffic amount; and
a modulation method setting portion which changes the modulation method used by the modulation portion based on the average traffic amount calculated by the average traffic amount calculation portion.

2. The wireless transmission apparatus according to claim 1, wherein the modulation method setting portion comprises:
a maximum acceptable traffic amount read portion which reads a maximum acceptable traffic amount linked to a modulation method currently used by the modulation portion from a relationship storage portion which links and stores both multiple modulation methods with different wireless transmission amounts from each other and the maximum acceptable traffic amounts that are maximum values of traffic amounts transmitted by using the modulation methods; and
a first modulation method setting portion which, if the average traffic amount is larger than the maximum acceptable traffic amount read by the maximum acceptable traffic amount, changes the modulation method used by the modulation portion to the modulation method which is stored in the relationship storage portion and which has minimum wireless transmission capacity between one or a plurality of modulation methods with larger wireless transmission capacity than the modulation method currently used by the modulation portion.

3. The wireless transmission apparatus according to claim 2, wherein the modulation method setting portion further comprises:
a minimum traffic amount read portion which, from the relationship storage portion, reads the maximum acceptable traffic amount as a minimum acceptable traffic amount which is linked to other modulation method and which is the largest maximum acceptable traffic amount between one or a plurality of maximum acceptable traffic amounts smaller than the maximum acceptable traffic amount read by the maximum acceptable traffic amount read portion; and a second modulation method setting portion which, if the average traffic amount is smaller than the minimum acceptable traffic amount read by the minimum acceptable traffic amount read portion, changes the modulation method used by the modulation portion to the modulation method which is stored in the relationship storage portion and which has maximum wireless transmission capacity between one or a plurality of modulation methods with smaller wireless transmission capacity than the modulation method currently used by the modulation portion.

4. The wireless transmission apparatus according to claim 3, wherein the modulation method setting portion further comprises a third modulation method setting portion which, if the traffic amount is smaller than the minimum acceptable traffic amount read by the minimum acceptable traffic amount read portion, changes the modulation method used by the modulation portion to the modulation method which is stored in the relationship storage portion and which has maximum wireless transmission capacity between one or a plurality of modulation methods with smaller wireless transmission capacity than the modulation method currently used by the modulation portion.

5. The wireless transmission apparatus according to claim 4, wherein the modulation method setting portion further comprises a fourth modulation method setting portion which, if a storage capacity of the transmission buffer portion exceeds a predetermined threshold, changes the modulation method used by the modulation portion to the modulation method which is stored in the relationship storage portion and which has minimum wireless transmission capacity between one or a plurality of modulation methods with larger wireless transmission capacity than the modulation method currently used by the modulation portion.

6. The wireless transmission apparatus according to claim 3, wherein the modulation method setting portion further comprises a fourth modulation method setting portion which, if a storage capacity of the transmission buffer portion exceeds a predetermined threshold, changes the modulation method used by the modulation portion to the modulation method which is stored in the relationship storage portion and which has minimum wireless transmission capacity between one or a plurality of modulation methods with larger wireless transmission capacity than the modulation method currently used by the modulation portion.

7. The wireless transmission apparatus according to claim 2, wherein the modulation method setting portion further comprises a fourth modulation method setting portion which, if a storage capacity of the transmission buffer portion exceeds a predetermined threshold, changes the modulation method used by the modulation portion to the modulation method which is stored in the relationship storage portion and which has minimum wireless transmission capacity between one or a plurality of modulation methods with larger wireless transmission capacity than the modulation method currently used by the modulation portion.

8. The wireless transmission apparatus according to claim 7, wherein the second modulation method setting portion, after changing the modulation method by the fourth modulation method setting portion thereof, inhibits change of the modulation method unless the average traffic amount exceeds the minimum acceptable traffic amount read by the minimum acceptable traffic amount read portion.

9. The wireless transmission apparatus according to claim 1, wherein
the transmission signal includes priority information which indicates transmission priority thereof, the transmission buffer portion comprises a plurality of storage areas corresponding to the transmission priority, the transmission signal registration portion registers the transmission signal to the storage area of the transmission buffer portion which corresponds to the transmission priority indicated by the priority information of the received transmission signal, and the modulation portion picks up the transmission signal which is registered at a first position of the storage area storing the transmission signals with the highest transmission priority between the storage areas of the transmission buffer portion storing the transmission signals, and modulates the picked up transmission signal.

10. A wireless transmission method using a wireless transmission apparatus for transmitting transmission signals via wireless transmission paths, comprising steps of:

by a transmission signal reception portion, receiving transmission signals;

by a transmission signal registration portion, registering the transmission signals received by the transmission signal reception portion to a transmission buffer portion;

by a modulation portion, picking up a transmission signal registered at a first position between the transmission signals stored in the transmission buffer portion and modulating the picked up transmission signal;

by a transmission portion, transmitting the transmission signal modulated by the modulation portion by using a transmission power amount which corresponds to a modulation method used by the modulation portion;

by a traffic amount calculation portion, calculating a traffic amount caused by the traffic signals received by the transmission signal reception portion at each predetermined unit time interval;

by an average traffic amount calculation portion, calculating an average traffic amount that is an average of the traffic amount calculated by the traffic amount calculation portion in a nearest predetermined interval every time the traffic amount calculation portion calculates the traffic amount; and by a modulation method setting portion, changing the modulation method based on the average traffic amount calculated by the average traffic amount calculation portion.

11. A non-transient, computer readable and tangible storage medium of a wireless transmission apparatus which transmits transmission signals via wireless transmission paths, the non-transient, computer readable and tangible storage medium storing a computer program that executes instructions comprising:

a transmission signal reception instruction for receiving transmission signals;

a transmission signal registration instruction for registering the transmission signals received by the transmission signal reception instruction to a transmission buffer portion;

a modulation instruction for picking up a transmission signal registered at a first position between the transmission signals stored in the transmission buffer portion and modulating the picked up transmission signal;

a transmission instruction for transmitting the transmission signal modulated by the modulation instruction by using a transmission power amount which corresponds to a modulation method used by the modulation portion;

a traffic amount calculation instructions for calculating a traffic amount caused by the traffic signals received by the transmission signal reception instruction at each predetermined unit time interval;

an average traffic amount calculation instruction for calculating an average traffic amount that is an average of the traffic amount calculated by the traffic amount calculation instruction in a nearest predetermined interval every time the traffic amount is calculated by the traffic amount calculation instruction; and a modulation method setting instruction for changing the modulation method based on the average traffic amount calculated by the average traffic amount calculation instruction.

12. A wireless transmission apparatus for transmitting transmission signals via wireless transmission paths, comprising:

a transmission signal reception portion receiving transmission signals;

a transmission signal registration portion registering the transmission signals received by the transmission signal reception portion to a transmission buffer portion;

a modulation portion which picks up a transmission signal registered at a first position between the transmission signals stored in the transmission buffer portion and which modulates the picked up transmission signal;

a transmission portion which transmits the transmission signal modulated by the modulation portion by using a transmission power amount which corresponds to a modulation method used by the modulation portion;

a traffic amount calculation portion which calculates a traffic amount caused by the traffic signals received by the transmission signal reception portion at each predetermined unit time interval;

a traffic amount analysis portion which determines the modulation method used by the modulation portion based on the traffic amount calculated by the traffic amount calculation portion; and a modulation method setting portion which changes the modulation method used by the modulation portion based on the modulation method determined by the traffic amount analysis portion, wherein the traffic amount analysis portion comprises:

an average traffic amount calculation portion which calculates an average traffic amount that is an average of the traffic amount in a nearest predetermined interval;

an integrated traffic amount calculation portion which calculates an integrated value of traffic amount exceeding a current wireless transmission capacity based on the traffic amount calculated by the traffic amount calculation portion;

a relationship storage portion which memorizes a wireless transmission capacity, a modulation method for conducting a transmission within the wireless transmission capacity, an acceptable transmission amount indicating a traffic amount that can be transmitted by using the modulation method and a transmission power amount required for transmission by using the modulation method while establishing a linkage therebetween; and a required band determination portion which refers to the relationship storage portion and which determines a modulation method and a transmission power amount based on the traffic amount calculated by the traffic amount calculation portion, the average traffic amount and the integrated traffic amount.

* * * * *